United States Patent [19]

Geissler

[11] Patent Number: 4,593,918

[45] Date of Patent: Jun. 10, 1986

[54] SEALING ARRANGEMENT

[76] Inventor: Alfred Geissler, Alpenstrasse 22, D-8999 Weiler-Simmerberg, Fed. Rep. of Germany

[21] Appl. No.: 629,710

[22] Filed: Jul. 11, 1984

[51] Int. Cl.$^4$ .............................................. F16J 15/34
[52] U.S. Cl. .................................................. 277/96.1
[58] Field of Search ............... 277/30, 81, 81 P, 96.1, 277/96 PT

[56] References Cited

U.S. PATENT DOCUMENTS

| | | | | |
|---|---|---|---|---|
| 2,283,594 | 5/1942 | Metcalf | ................................ | 123/190 |
| 2,916,332 | 12/1959 | Pavlecka | ............................ | 271/96.1 |
| 4,407,509 | 10/1983 | Etsion | ................................ | 277/96.1 |
| 4,461,487 | 7/1984 | Matsumoto | ....................... | 277/96.1 |

FOREIGN PATENT DOCUMENTS 758968  5/1943  Fed. Rep. of Germany .
904959  7/1949  Fed. Rep. of Germany .

Primary Examiner—Robert I. Smith
Attorney, Agent, or Firm—Kuhn Muller and Bazerman

[57] ABSTRACT

A sealing arrangement for a ball-shaped or planar rotary valve of an internal combustion engine comprises a hollow sealing body mounted for rotation in a gas channel of the cylinder head and sealingly engaging the outside sealing surface of the rotary valve. A backside surface of the sealing body turned away from the combustion chamber is permanently exposed to the gas pressure therein in order to urge the sealing body inwards against the rotary valve with a sealing force dependent on the momentary gas pressure.

6 Claims, 7 Drawing Figures

FIG.6
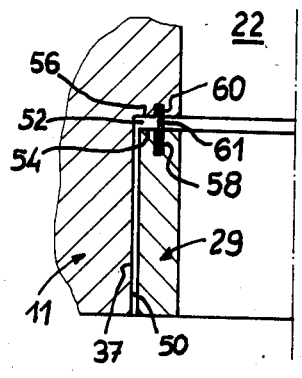
FIG.5
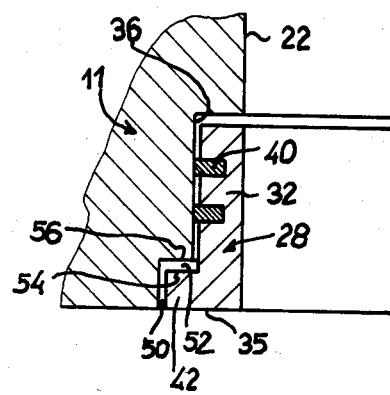
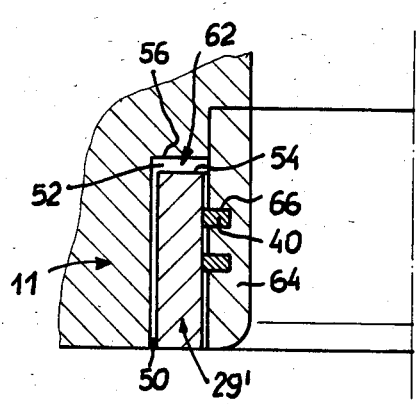
FIG.7

SEALING ARRANGEMENT

BACKGROUND OF THE INVENTION

The inventions concerns a sealing arrangement for a rotary valve member arranged within the combustion chamber of an internal combustion engine, the rotary valve member provided for opening and closing gas inlet and outlet channels provided in the cylinder head, the sealing arrangement comprising a hollow substantially cylindrical sealing body arranged axially displaceable in each one of the gas channels, the sealing body by a sealing force being urged in the direction of the rotary valve member and held in sealing contact therewith.

U.S. Pat. No. 2,283,594 shows a sealing arrangement of this kind in which the sealing body is urged by a helical spring against the rotary valve having a conical sealing surface. The spring must be strong to overcome the maximum gas pressure and therefor for the most time during the working cycle is overdimensioned. The strong spring force results in forming flutes or marks in the sealing surfaces and therefore no long-time sealing effect is possible. Further an absolutely uniform contact of the sealing body along the whole periphery thereof is not possible because of non-uniform wear and different heat deformation in the peripheral areas of the sealing body.

From German Pat. No. 758,968 it is known to urge the sealing body in contact with the ball-shaped inside surface of the rotary valve by gas pressure which is admitted to the front face of the sealing member facing the rotary valve. The sealing member therefore is urged outwardly. Further it is mounted for rotation about the axis of the gas channel. Although this concept is advantageous with respect to the non-rotatable sealing body the disadvantage consists in that the sealing body lies inside of the rotary valve member within the combustion chamber and is exposed to the hot gas. Therefor the sealing body will be warped upon heat effect and because of carbon deposit becomes seized.

German Pat. No. 904,959 shows a ball-shaped rotary valve in the gas channel of which the sealing body is mounted for rotation and urged outwards by the gas pressure against the inside surface of the cylinder head. Because the same disadvantages even to a greater extent exist no long-life sealing can be achieved.

BRIEF SUMMARY OF THE INVENTION

It is one object of the invention to provide a novel sealing arrangement avoiding the disadvantages mentioned above.

One further object of the invention is to provide a sealing arrangement in which the hollow sealing bodies are protected against hot combustion gases and a long-life sealing effect is achieved.

One further object is to use the concept of permanently rotating sealing bodies and to urge them against the rotary valve member having a ball-shaped or planar sealing surface with a sealing force which is dependent on the momentary gas pressure in the cylinder.

Further it is an object of the invention to provide a sealing arrangement in which the gas pressure is admitted to a back side end surface of the hollow sealing body which is turned away from the combustion chamber to urge the sealing body inwards in sealing contact with the rotary valve member.

These and other objects and features of the invention will become apparent from the following description in connection with the drawings and from the claims.

BRIEF DESCRIPTION OF THE DRAWINGS

FIG. 5 is a cross-section similar to FIG. 3 but in connection with the rotary valve member of FIG. 4;

FIG. 6 is a cross-section similar to FIG. 5 but showing a modified example of the sealing arrangement; and FIG. 7 is a cross-section of a further modification of a sealing arrangement.

DESCRIPTION OF THE PREFERRED EMBODIMENTS

Figure 1:
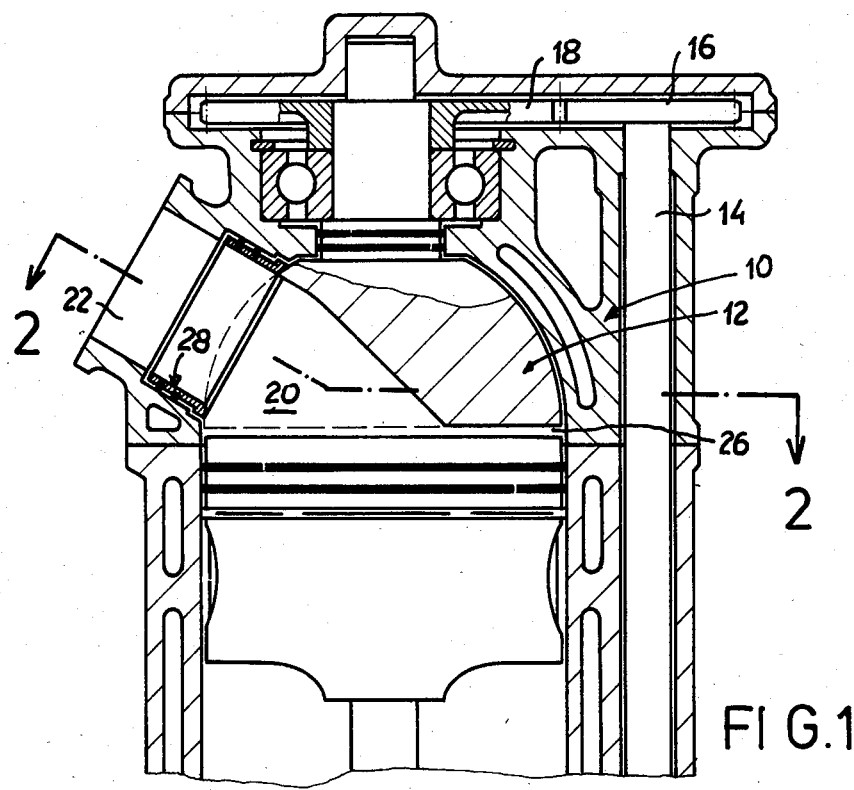
FIG. 1 is a sectional elevation of the cylinder head comprising one example of a sealing arrangement made in accordance with the invention.
Figure 2:
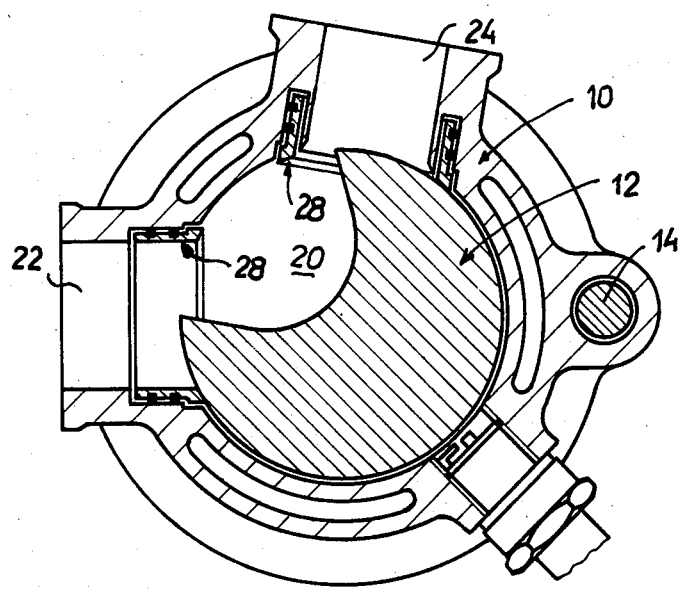
FIG. 2 is a cross-section taken along line 2—2 of FIG. 1.

A cylinder head 10 has a ball-shaped combustion chamber in which a rotary valve member 12 with an overall radial interspace is mounted for rotation about an axis coinciding with the cylinder axis and driven via gears 16, 18 and a shaft 14 by the crank shaft of the internal combustion engine. The rotary valve member has an eccentric gas channel 20 which upon rotation of the rotary valve member 12 intermittently connects the combustion chamber 26 with a gas inlet channel 22 and a gas outlet channel 24. Each of the gas channels 22, 24 has a stepped cylindrical bore and in the enlarged inside end portion 36 of which a cylindrical hollow sealing body 28 is mounted for rotation about the channel axis 30 and for axial displacement. The sealing body 28 has a tube portion 32 and an outwardly protruding flange 42 at the front end thereof. The front side sealing surface 34 of the sealing body 28 including the flange 42 is ball-shaped and is completely and permanently held in sealing contact with the correspondingly ball-shaped sealing surface of the rotary valve member 12 by means of a weak spring 44 inserted in an annular groove 46 of the cylinder head 10 and surrounding that gas channel 22 and acting on the back-side end face of the sealing body 28. The tube portion 32 of the sealing body 28 is provided with a pair of peripheral grooves 38 opening outwardly. Sealing rings 40 which sealingly contact the enlarged bore portion 36 are inserted in the grooves 38 and mount the sealing body for rotation which is driven by the rotating rotary valve member 12 due to the sliding frictional forces which are greater in the lower half of the sealing body 28 than in the upper half. Therefore a resulting driving force is present.

The flange 42 is within an annular recess 48 of the cylinder head 10 and between the inside peripheral surface of that recess 48 and the outside peripheral surface of the flange 42 a peripheral gap 50 is formed permanently communicating with the combustion chamber 26. The back-side end face 54 of the flange 42 is spaced from an adjacent annular surface 56 of the cylinder head 10 and an annular gap 52 is formed therebetween permanently communicating with the peripheral gap 50. Therefor a back-side ring surface of the flange 42 defined by the outside diameters of the flange 42 and the sealing rings 40 is exposed to the gas pressure in the combustion chamber 26 urging the sealing body 28 inwards into sealing contact with the rotary valve member 12. This gas pressure force forms the main sealing force and the spring 44 is only an auxiliary element which provides that the sealing body 28 maintains its sealing contact in cases of low pressure in the combustion chamber 26.

Figure 4:
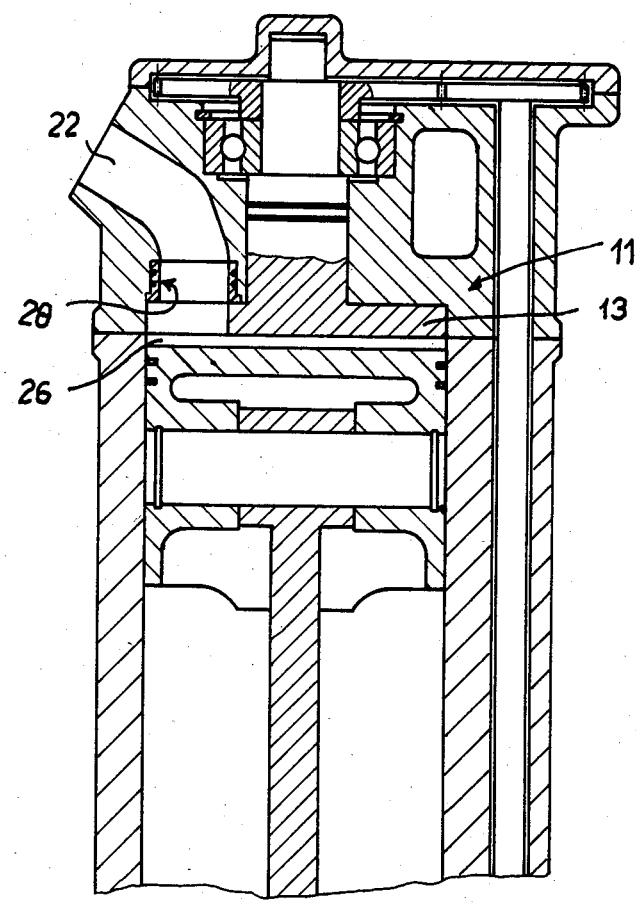
FIG. 4 is a sectional elevation of the cylinder head showing a modified rotary valve member.

FIG. 4 shows a cylinder head 11 having a flat combustion chamber 26 and a planar-shaped rotary valve element 13. The sealing bodies 28 correspondingly have planar sealing surfaces 35 (FIG. 5) arranged at right angles with the rotation axes thereof. It is common to both said ball-shaped and planar constructions of the rotary valve members 12, 13 that a ring-shaped sealing area is formed at each gas channel, whereby the outside and inside borders of the sealing area are formed by concentric circles the common center line thereof coinciding with the axis of the sealing member 28. The constructions of FIGS. 1 and 4 differ from one another mainly in that in the ball-shaped construction the rotation axis of the sealing member 28 is inclined with respect to the axis of the rotary valve member 12 whilst in the planar construction the corresponding axes are parallel with one another.

FIG. 6 shows a sealing body 29 in the form of a cylindrical tube section without a flange. The sealing body 29 is rotatably arranged in a cylindrical recess 37 of the gas channel 22, but between the sealing body 29 and the recess 37 the peripheral gap 50 is formed extending over the whole length thereof. An annular groove 58 is formed in the back-side end surface 54 of the sealing member 29 and a similar annular groove 60 is formed in an adjacent front face 56 forming the bottom of the recess 37. A ring-shaped sealing band 61 is loosely inserted with both its opposite ends into the grooves 58, 60. Outside of the sealing band 61 the annular gap 52 is formed communicating via the peripheral gap 50 with the combustion chamber 26. The gas pressure therefor acts on the back-side end face 54 of the sealing body 29. The effective area is ring-shaped and defined by the outside diameters of the sealing body 29 and the sealing band 61.

FIG. 7 shows a further modification of a sealing arrangement in which a peripheral wall 64 is fastened in the cylinder head 11 surrounding the gas channel 22 and extending almost down to the rotary valve member 13. A ring-shaped recess 62 is formed between the peripheral wall 64 and the cylindrical inside surface of a stepped bore portion of the gas channel 22. A cylindrical sealing body 29' is mounted in the ring-shaped recess 62 for rotation and axial displacement. The peripheral gap 50 and the annular gap 52 are formed as described with respect to FIG. 6, but in the construction of FIG. 7 the whole back-side end face of the sealing body 29' is exposed to the gas pressure. The peripheral wall has two peripheral grooves 66 opening outwards and sealing rings 40 are arranged therein sealingly contacting the sealing body 29'.

The peripheral wall 64 of FIG. 7 protects the sealing body 29' additionally and therefor this feature is especially appropriate for the gas outlet channels. It should be evident that the peripheral wall is not limited to the special sealing concept of FIG. 7 but can advantageously be used also in connection with the sealing bodies 28 and 29, which then are protected in the ring-shaped recesses 62.

Figure 3:
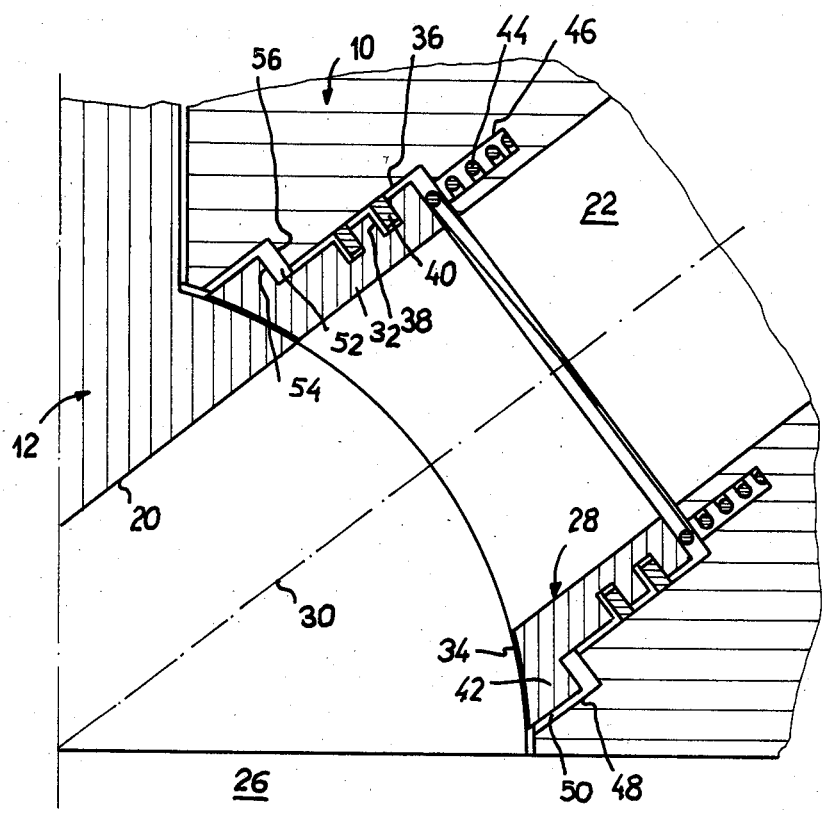
FIG. 3 is an enlarged cross-section of FIG. 2 showing the sealing arrangement in greater detail.

It should also be noticed, that the embodiments shown in FIGS. 6 and 7 are not limited to planar rotary valves 13 but can be used also in ball-shaped constructions. The planar sealing surfaces must only be replaced by ball-shaped surfaces 34 as shown in FIG. 3.

I claim:

1. An improvement in a sealing arrangement of a rotary valve member arranged within a combustion chamber of an internal combustion engine, the rotary valve member provided for opening and closing gas inlet and outlet channels provided in a cylinder head, the selaing arrangement comprising a substantially cylindrical sealing ring mounted for rotation and axial displacement in each one of the gas channels, an annular gap formed between a rearward surface of the sealing ring and an adjacent surface of the cylinder head, said annular gap permanently communicating with the combustion chamber and by the gas pressure therein forcing the sealing ring in its axial direction against the rotary valve member and forming a sealing contact therebetween, the improvement comprising:

the sealing ring being arranged at that side of the rotary valve member which is opposite to the combustion chamber and a connecting channel being provided outside of the outer periphery of the sealing ring and connecting said annular gap with the combustion chamber, thereby urging the sealing ring inwardly in direction onto the combustion chamber.

2. A sealing arrangement as claimed in claim 1 wherein a weak mechanical spring is supported in the cylinder head acting on said sealing ring axially in the direction of the rotary valve member.

3. A sealing arrangement as claimed in claim 1, wherein the connecting channel is formed by a ring-shaped recess provided between the sealing ring and the cylinder head, coaxially surrounding the gas channel and opening into the combustion chamber.

4. A sealing arrangement as claimed in claim 1, wherein the sealing ring is provided with an outwardly extending flange, the front surface of which contacts the rotary valve member, the outside diameter of the flange being dimensioned greater than the inside diameter of a cylinder head bore in which the sealing ring is mounted for axial displacement, and wherein said annular gap is formed between said flange and an adjacent face of the cylinder head.

5. A sealing arrangement as claimed in claim 1, wherein annular grooves are formed in said surfaces respectively, defining said annular gap therebetween, and at least one ring-shaped sealing band being inserted with both of its opposite ends into said annular grooves respectively.

6. A sealing arrangement as claimed in claim 3, wherein the cylinder head comprises a peripheral wall surrounding the gas channel and provided between the gas channel and said ring-shaped recess, and sealing means are provided between the peripheral wall and the sealing ring.

* * * * *